United States Patent
Chen (10) Patent No.: US 12,328,304 B2
(45) Date of Patent: Jun. 10, 2025

(54) SECURE AND PRIVACY PRESERVING MESSAGE ROUTING SYSTEM

(71) Applicant: Visa International Service Association, San Francisco, CA (US)

(72) Inventor: Yuexi Chen, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/841,316

(22) PCT Filed: May 23, 2022

(86) PCT No.: PCT/US2022/030551
§ 371 (c)(1),
(2) Date: Aug. 23, 2024

(87) PCT Pub. No.: WO2023/229571
PCT Pub. Date: Nov. 30, 2023

(65) Prior Publication Data
US 2025/0112902 A1    Apr. 3, 2025

(51) Int. Cl.
*H04L 9/40* (2022.01)
(52) U.S. Cl.
CPC ............... *H04L 63/0428* (2013.01)
(58) Field of Classification Search
CPC .................................. H04L 63/0428
See application file for complete search history.

(56) References Cited

U.S. PATENT DOCUMENTS

| 9,367,843 | B2 | 6/2016 | Jurrs |
| 10,636,032 | B2 | 4/2020 | Ozvat et al. |
| 2019/0251590 | A1* | 8/2019 | Bodington ............ G06Q 30/02 |
| 2020/0065803 | A1 | 2/2020 | Abouelenin |

(Continued)

FOREIGN PATENT DOCUMENTS

| JP | 2022516352 A | 2/2022 |
| KR | 20200002882 A | 1/2020 |
| KR | 20220062501 A | 5/2022 |

OTHER PUBLICATIONS

PCT/US2022/030551, "International Search Report and Written Opinion", Feb. 9, 2023, 10 pages.

(Continued)

*Primary Examiner* — Henry Tsang
(74) *Attorney, Agent, or Firm* — Kilpatrick Townsend & Stockton LLP (57) ABSTRACT

A method is disclosed. The method includes receiving, by a user device from the access device, a routing path list comprising a first set of network nodes. After receiving the routing path list, the user device determines a routing options list comprising a second set of network nodes based on the first set of network nodes in the routing path list. The method also includes obtaining an encrypted credential or token, and transmitting, by the user device to the access device, the routing options list, and the encrypted credential or token to the access device. The access device transmits an authorization request message comprising the encrypted credential or token, and the routing options list to a server computer via at least some of the network nodes in the second set of network nodes. The server computer may be an authorizing entity computer.

20 Claims, 4 Drawing Sheets

(56) References Cited

U.S. PATENT DOCUMENTS

2021/0058373 A1* 2/2021 Hall .................. H04L 45/02
2021/0067316 A1   3/2021 Bellenger et al.
2022/0156732 A1* 5/2022 Powell ................ G07F 7/1091
                                                    705/76

OTHER PUBLICATIONS

EP22943968.2, "Extended European Search Report", Apr. 14, 2025, 11 pages.
Rekhter et al., "A Border Gateway Protocol (BGP)", Request for Comments: 4271, Jan. 2006, pp. 1-104.

* cited by examiner

SECURE AND PRIVACY PRESERVING MESSAGE ROUTING SYSTEM

CROSS-REFERENCE TO RELATED APPLICATIONS

This application is a National Stage of International Application No. PCT/US2022/030551, filed May 23, 2022, which is herein incorporated by reference in its entirety.

BACKGROUND

Privacy protection and data security are important when transmitting data between nodes in a network. For example, in a payment system, a bank identification number (BIN), and a primary account number (PAN) or token can be used to route messages (e.g., authorization request and response messages) between endpoints. Both the BIN and the PAN (or token) are static. The messages including the BIN and the PAN may pass through nodes as they pass between the endpoints. The BIN and PAN can be potentially obtained and used by the operators of any of the nodes (e.g., a merchant, a service provider, acquirer or other entity) in the system without the user's consent. The operators of the nodes may do so, for example, to track the user's activities. This not desirable from a privacy or security perspective.

In today's environment, a secure encryption channel can be formed between a user device (e.g., an access card) used by a user and an access device (e.g., a terminal) operated by a resource provider. The encryption channel can encrypt sensitive information passing from the user device to the access device to protect it. However, after the encrypted sensitive information is received by the access device, the access device will decrypt any encrypted sensitive data. The access device will then forward an authorization request message comprising the unencrypted sensitive data to an authorizing entity computer for authorization. The plaintext sensitive information can pass through nodes such as service provider computers, processing network computers, and transport computers before it arrives at the authorizing entity computer. In this situation, the sensitive data could be susceptible to man-in-the-middle attacks, hacking, or unauthorized use by the operators of the nodes.

In other cases, point-to-point encryption schemes may be used where each set of adjacent nodes uses a pair of cryptographic keys to secure sensitive information that passes between them. For example, an access device and a transport computer operated by an acquirer may share one cryptographic key pair to encrypt and decrypt information transmitted between them. The transport computer and a downstream processing network computer may share another cryptographic key pair to encrypt information transmitted between them. Although the use of point-to-point encryption schemes can protect information as it is transmitted between nodes, the information is still viewable by the operators of the nodes, since the nodes need to decrypt encrypted the information to determine where and how to route messages including the information. Also, such point-to-point encryption schemes require each node to have and maintain many different cryptographic key sets. This is burdensome.

End-to-end encryption of the sensitive information between the user device and the authorizing entity computer is not used in today's multi-party interaction systems which may contain multiple nodes. This is because the sensitive information (e.g., the PAN or token) in the authorization request messages is often used to route them through the nodes and to the authorizing entity computer. If the sensitive information is encrypted, then such routing may not be possible in conventional systems.

Embodiments of the disclosure address these and other problems, individually and collectively.

SUMMARY

Embodiments of the invention includes methods and systems which can improve the security and efficiency of data transmissions between an access device and an authorizing entity computer.

One embodiment includes establishing communication between a user device and an access device in an interaction; receiving, by the user device from the access device, a routing path list comprising a first set of network nodes; after receiving the routing path list, determining, by the user device, a routing options list comprising a second set of network nodes based on the first set of network nodes in the routing path list; obtaining, by the user device, an encrypted credential or token; and transmitting, by the user device to the access device, the routing options list, and the encrypted credential or token to the access device, wherein the access device transmits an authorization request message comprising the encrypted credential or token, and the routing options list to a server computer (e.g., authorizing entity computer, a processing network computer, etc.) via at least some of the network nodes in the second set of network nodes.

Another embodiment includes a user device comprising: a processor; and a non-transitory computer readable medium, coupled to the processor, the computer readable medium comprising code, executable by the processor, for implementing a method comprising: establishing communication between a user device and an access device in an interaction; receiving, from the access device, a routing path list comprising a first set of network nodes; after receiving the routing path list, determining a routing options list comprising a second set of network nodes based on the first set of network nodes in the routing path list; obtaining an encrypted credential or token; and transmitting, to the access device, the routing options list, and the encrypted credential or token to the access device, wherein the access device transmits an authorization request message comprising the encrypted credential or token, and the routing options list to a server computer via at least some of the network nodes in the second set of network nodes.

Another embodiment includes a method comprising: establishing communication between a user device and an access device in an interaction; transmitting, by the access device to the user device, a routing path list comprising a first set of network nodes; receiving, by the access device from the user device, a routing options list comprising a second set of network nodes based on the first set of network nodes in the routing path list, and an encrypted credential or token; generating, by the access device, and an authorization request message comprising the encrypted credential or token, and the routing options list; and transmitting, by the access device to a server computer via at least some of the network nodes in the second set of network nodes, the authorization request message comprising the encrypted credential or token.

Further details regarding embodiments of the disclosure are described in the Detailed Description and the Figures.

DETAILED DESCRIPTION

Prior to discussing the details of some embodiments of the present disclosure, description of some terms may be useful.

A "user device" may be any suitable device that can be used by a user (e.g., a payment card or mobile phone). User devices may be in any suitable form. Some examples of user devices include cards (e.g., payment cards such as credit, debit, or prepaid cards) with magnetic stripes or contactless elements (e.g., including contactless chips and antennas), cellular phones, PDAs, personal computers (PCs), tablet computers, and the like. In some embodiments, where a user device is a mobile device, the mobile device may include a display, a memory, a processor, a computer-readable medium, and any other suitable component.

A "mobile device" (sometimes referred to as a mobile communication device) may comprise any suitable electronic device that may be transported and operated by a user, which may also provide remote communication capabilities to a network. A mobile communication device may communicate using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet or a private network. Examples of mobile devices include mobile phones (e.g. cellular phones), PDAs, tablet computers, net books, laptop computers, wearable devices (e.g., watches), vehicles such as automobiles and motorcycles, personal music players, hand-held specialized readers, etc. A mobile device may comprise any suitable hardware and software for performing such functions, and may also include multiple devices or components (e.g. when a device has remote access to a network by tethering to another device—i.e. using the other device as a modem-both devices taken together may be considered a single mobile device).

A "contactless" communication may be a communication in which data is exchanged between two devices without the need for the devices to be physically coupled. Without limiting the generality of the foregoing, "contactless" communication can include data transmissions by near-field communication (NFC) transceiver, laser, radio frequency, infrared communications, or other radio frequency or wireless communication protocols such as Bluetooth, Bluetooth low-energy (BLE), Wi-Fi, iBeacon, etc.

An "access device" may be any suitable device for providing access to something. An access device may be in any suitable form, and can be an access terminal. Some examples of access devices include point of sale (POS) devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, transit or event gates, access systems, websites, and the like. An access device may use any suitable contact or contactless mode of operation to send or receive data from, or associated with, a user device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a user device.

A "resource provider" can be an entity that provides resources (e.g., goods, services, access to secure data, access to locations, or the like) during a transaction. For example, a resource providing entity can be a merchant, a transit or venue operator, a building owner, a governmental entity, etc. A "merchant" may typically be an entity that engages in transactions and can sell goods or services, or provide access to goods or services.

"Authentication data" may include any data suitable for authenticating an entity. Authentication data may be obtained from a user or a device that is operated by the user. Examples of authentication data obtained from a user may include PINs (personal identification numbers), biometric data, passwords, etc. Examples of authentication data that may be obtained from a device may be include device serial numbers, hardware secure element identifiers, device fingerprints, phone numbers, IMEI numbers, etc.

"Access data" may include any suitable data that can be used to access a resource or create data that can access a resource. In some embodiments, access data may be account information for a payment account. Account information may include a PAN, payment token, expiration date, verification values (e.g., CVV, CVV2, dCVV, dCVV2), etc. In other embodiments, access data may be data that can be used to activate account data. For example, in some cases, account information may be stored on a mobile device, but may not be activated until specific information is received by the mobile device. In other embodiments, access data could include data that can be used to access a location. Such access data may be ticket information for an event, data to access a building, transit ticket information, etc. In yet other embodiments, access data may include data used to obtain access to sensitive data. Examples of access data may include codes or other data that are needed by a server computer to grant access to the sensitive data.

An "access request" may include a request for access to a resource. The resource may be a physical resource (e.g., good), digital resources (e.g., electronic document, electronic data, etc.), or services. In some cases, an access request may be submitted by transmission of an access request message that includes access request data. Typically, a device associated with a requestor may transmit the access request message to a device associated with a resource provider.

"Access request data" may include any information surrounding or related to an access request. Access request data may include access data. Access request data may include information useful for processing and/or verifying the access request. For example, access request data may include details associated with entities (e.g., resource provider computer, processing server computer, authorization computer, etc.) involved in processing the access request, such as entity identifiers (e.g., name, etc.), location information associated with the entities, and information indicating the type of entity (e.g., category code). Exemplary access request data may include information indicating an access request amount, an access request location, resources received (e.g., products, documents, etc.), information about the resources received (e.g., size, amount, type, etc.), resource providing entity data (e.g., resource provider data, document owner data, etc.), user data, date and time of an access request, a method utilized for conducting the access request (e.g., contact, contactless, etc.), and other relevant information.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc. Other examples of credentials include PANs (primary account numbers), PII (personal identifiable information) such as name, address, and phone number, and the like.

An "authorizing entity" may be an entity that authorizes a request, typically using an authorizing computer to do so. An authorizing entity may be an issuer, a governmental agency, a document repository, an access administrator, etc. An "issuer" may typically include a business entity (e.g., a bank) that maintains an account for a user. An issuer may also issue payment credentials stored on a user device, such as a cellular telephone, smart card, tablet, or laptop to the user.

A "service provider" may be an entity that can provide a resource such as goods, services, information, and/or access typically through a service provider computer. Examples of service providers include data providers, transit agencies, merchants, digital wallets, payment processors, etc.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

An "authorization request message" may be an electronic message that requests authorization for an interaction. In some embodiments, it is sent to a processing network computer and/or an issuer of a payment card to request authorization for a transaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction value, merchant identifier, merchant location, acquirer bank identification number (BIN), card acceptor ID, information identifying items being purchased, etc., as well as any other information that may be utilized in determining whether to identify and/or authorize a transaction. An "authorization request message" may also be used to request authorization to access a location, access secure data, etc.

An "authorization response message" may be a message that responds to an authorization request. In some cases, it may be an electronic message reply to an authorization request message generated by an issuing financial institution or a processing network computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the processing network computer) to the merchant's access device (e.g., POS equipment) that indicates approval of the transaction. The code may serve as proof of authorization.

An "authorizing entity" may be an entity that authorizes a request. Examples of an authorizing entity may be an issuer, a transit agency, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the consumer, or in some embodiments, a portable device.

A "server computer" is typically a powerful computer or cluster of computers. For example, the server computer can be a large mainframe, a minicomputer cluster, or a group of servers functioning as a unit. In one example, the server computer may be a database server coupled to a Web server. Examples of server computers include authorizing entity computers, processing network computers, transport computers, etc.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

An "application" may be a computer program that is used for a specific purpose. Examples of applications may include transit applications, secure data access applications, banking applications, digital wallet applications, event ticketing applications, loyalty rewards applications, etc. In some embodiments, an application may be associated with an account of the user maintained by a resource or service provider (e.g., a bank account, a mass transit prepaid account, a building access account, etc.).

An "Application Identifier" (AID) can be data that can identify an application. In some embodiments, a AID may be a 16 byte value that is used to uniquely identify each application. Both user devices and access devices may support multiple AIDs. An AID may also be used to identify the system environment supported by an access device (e.g., PSE, PPSE). A user device may store a list of applications identifiers, where each application identifier corresponds to a different application on the user device. The AIDs of one or more applications on the list may be transmitted to the access device during the transaction initialization process, to be used by the access device in determining which applications are mutually supported by both the access device and the user device, and ultimately which application should be selected by the access device from a candidate list to initiate a transaction. In some embodiments, an AID can be formed by the concatenation of a Registered Application Provider Identifier (RID) of 5 bytes, which may be a hexadecimal value, and an optional Proprietary Application Identifier Extension (PIX), which is typically a numeric value. For example, the AID for an access device supporting PPSE may be hexadecimal 325041592E5359532E4444463031 (i.e. RID of hexadecimal 325041592E and a PIX extension of hexadecimal 5359532E4444463031). Also, the AID for a credit card application may, for example, have a RID value of hexadecimal A000000003 and a PIX value of hexadecimal 1010. Thus, concatenated, the AID may be hexadecimal A0000000031010.

A "Payment System Environment" (PSE) can be a mechanism for a user device to store a directory structure that holds records containing several applications that are available on the user device to be used to execute transactions. The "Proximity Payment System Environment" (PPSE) is applicable only for contactless communication between a user device and an access device. The PPSE on a user device contains a list of all applications supported by the contactless interface and is returned from the user device to an access device that issued a SELECT command for the PPSE. Both the PSE and PPSE mechanisms may be used to facilitate a message exchange protocol whereby an access device may select an application (e.g., from the returned list of applications) on a user device to proceed with a transaction. The messages exchanged under both the PSE and PPSE mechanisms may utilize an "Application Protocol Data Unit" (APDU) format. The APDU is a data unit transferred between an access device and a user device. A transaction may include multiple APDU exchanges to read data from a user device and perform the necessary processing steps.

A "Cardholder Verification Method" (CVM) is a function performed by the system (e.g., an access device or user device) to verify the identity of a cardholder or user. A CVM may include verification mechanisms including inputting a passcode or online PIN, cardholder signature, and the like. "Consumer Device Cardholder Verification Method" (CDCVM) is a type of CVM wherein the cardholder is verified via their user device (e.g., smartphone) instead of being verified by a terminal. CDCVM may include, in addition to the mechanisms listed above (performed locally on the user device), biometric verification (e.g., fingerprint or facial recognition) or entering a user device passcode. In some cases, an access device may require a user to perform CDCVM before initializing the transaction.

Embodiments of the invention can advantageously provide end-to-end encryption of sensitive information such as primary account numbers (e.g., PAN) or tokens in authorization request messages that are passed between user devices and authorizing entity computers. The authorizing entity computers may be operated by authorizing entities such as issuers. In embodiments of the invention, new data elements, routing paths (RPs) and routing options (ROs) can be used to route messages between end points and through nodes in a network without exposing sensitive information.

In embodiments of the invention, a user device can communicate with an access device such as a POS (point of sale) terminal. The communication between the user device and the access device may be through physical and electrical contact (e.g., a chip card dip) or through a wireless communication mechanism (e.g., NFC or near field communications, BLE or Bluetooth™ Low Energy, WiFi™, etc.). In some embodiments, the access device can use an AID or application identifier to select an application on the user device to process a transaction. The access device can also send a list of routing paths and nodes to the user device.

Table 1 below shows an exemplary routing path list that may be provided by the access device to the user device.

TABLE 1

Example routing path (RP) list sent by access device

| Routing node | Tag | Values |
|---|---|---|
| PSP | DF01 | 901234 (PSP ID, e.g., Square) |
| Acquirer | DF02 | 104116 (Acquirer ID, e.g., ChaseNet) |
| Network | DF03 | 40 (Visa) 41 (MasterCard) 43 (Discover) 86 (UnionPay) 171 (Domestic Debit Network, e.g., CB) |
| Issuer | DF04 | FFFFFFFF (Any BIN of issuer) |

As shown above, the routing path list can include a description of the routing node types (e.g., PSP, Acquirer, Network, Issuer, etc.), tags for the routing node types, and specific nodes that are compatible with the access device. For example, the node type identified as "Network" may be a payment processing network and may be identified by a tag DF03. The specific value "40" in Table 1 may indicate that the access device can use at least the "Visa" network corresponding to the value "40" and the "Discover" network corresponding to the value "43." In some cases, a wildcard indicator may indicate that any node can be used for the node type. For example, in Table 1, the Issuer node could be any issuer as indicated by the value "FFFFFFFF." The routing paths may be defined by different combinations of allowable routing nodes as shown in Table 1.

Table 2 below shows a list of routing options that can be returned by the user device after the user device receives the routing path list from the access device. The routing options may be defined by different combinations of allowable routing nodes as shown in Table 2. The user device can have its own list of routing paths and can compare its list of routing paths to the list of routing paths received from the access device. The routing paths that are compatible with both the access device and the user device can be used to form the list of routing options.

TABLE 2

Example routing options (RO) list returned by the user device

| Routing node | Tag | Values |
| --- | --- | --- |
| PSP | DF01 | 901234 (Preferred PSP ID, e.g., Square) FFFFFF (Any PSP) |
| Acquirer | DF02 | 104116 (Preferred Acquirer ID, e.g., ChaseNet) FFFFFF (Any acquirer) |
| Network | DF03 | 40 (Visa) 86 (Domestic Debit Network, e.g., CB) |
| Issuer | DF04 | 40001234 (BIN of issuer) |

As shown above, like the routing path list that is described above, the routing options list can include descriptions of the type of nodes in the network (e.g., PSP, Acquirer, Network, Issuer, etc.) that can receive and/or route messages, tags associated with the routing nodes, and values associated with the tags.

Table 2 shows the routing options list that is returned by the user device after it receives the routing path list of Table 1 and compares it to its own routing path list. The routing options list contains a list of nodes that are compatible with both the access device and the user device. For example, Table 2 shows that the user device has determined that the data on the user device is compatible with the "Visa" network by the value "40," but would not be compatible with the "Discover" network identified in Table 1. As such, the value "43" for the "Discover" network would not be present in the routing options list in Table 2. However, the value "40" for Visa is compatible with both the access device and the user device, and it thus included in the routing options list of Table 2.

In embodiments of the invention, the specific node values in the routing options list identify nodes that are supported by the access device (which can be set by merchant and/or acquirer) and the authorizing entity (e.g., issuer) that issued the user device. After the access device receives the routing options list, the access device can generate an authorization request message comprising the routing options list (e.g., in Table 2), encrypted sensitive information (e.g., an encrypted PAN), and any other information (e.g., an amount, a cryptogram, etc.) needed to facilitate the transaction. The user device can encrypt the sensitive information with a first cryptographic key on the user device. The first cryptographic key may have been provisioned or loaded to the user device by an entity such as an authorizing entity operating an authorizing entity computer. The authorization request message can be sent from the access device to an authorizing entity computer associated with the authorizing entity via the nodes (e.g., PSPs, transport computers, networks, etc.) identified in the routing options list. Once the authorization request message is received by the authorizing entity computer, the authorizing entity computer can decrypt the encrypted sensitive information using a second cryptogram key that corresponds to the first cryptographic key.

In embodiments of the invention, the nodes in the overall network can use the routing options list of Table 2 to determine which downstream nodes that they can forward the authorization request messages. In some embodiments, the order of the values in each routing node in the table can represent the preferred node of the authorizing entity that issued the user device. For example, with reference to the routing options list in Table 2, the authorizing entity associated with the BIN (bank identifier number) 40001234 can have a first preference to route messages to PSP 901234, acquirer 101116, and network 40.

In an example, an authorization request message comprising encrypted sensitive information can be sent with the routing options list in Table 2. The path of the authorization request message may pass from the access device, to a PSP, to an Acquirer, to a Network, and then to an Issuer for authorization. Thus, when the routing options list is returned be user device to the access device, the access device can use the value in tag DF01 to choose a specific PSP, the PSP can use the value in the tag DF02 to choose an Acquirer, the Acquirer uses the tag DF03 to choose a Network, and the Network can use the tag DF04 to choose an issuer.

By using the routing options list, encrypted data can be efficiently routed through a network of nodes to the correct authorizing entity computer (or other server computer). The data that is encrypted is protected, and only the authorizing entity has the corresponding key to decrypt the encrypted sensitive information. The cryptographic key used to encrypt the sensitive information may be a symmetric key or a public key of a public-private key pair. If the key is a symmetric key, it may be independently derivable by both the user device and the authorizing entity computer. Alternatively, the user device may provide a key index to the access device, which may be included in an authorization request message and may be used by an authorizing entity computer to identify a corresponding symmetric key that can be used to decrypt the encrypted sensitive information.

Figure 1:
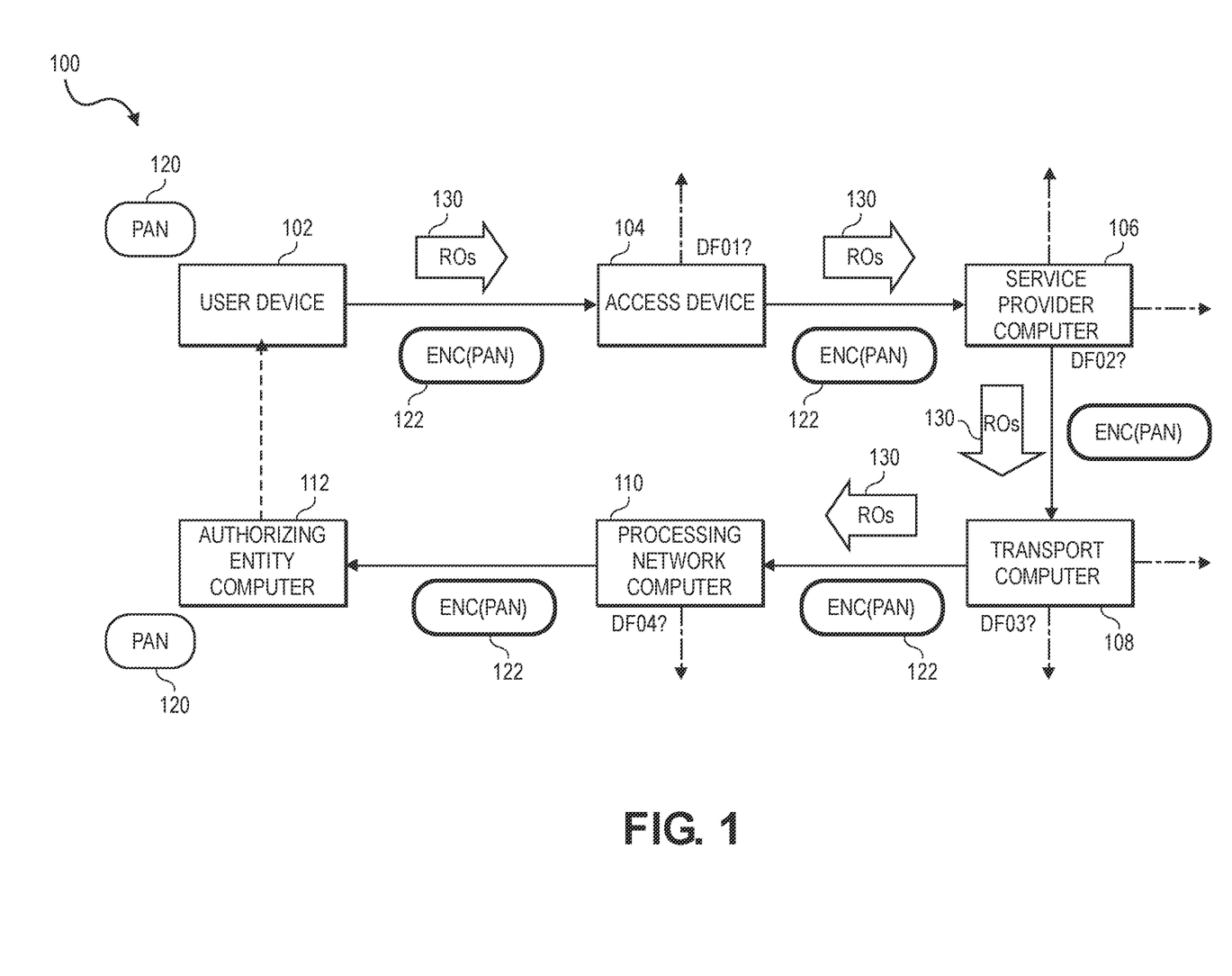
FIG. 1 shows a system diagram and a process flow block diagram of a system according to an embodiment.

FIG. 1 shows a system 100 according to embodiments of the invention. For clarity, a certain number of components are shown in FIG. 1. It is understood that embodiments of the disclosure may include more than one of each component.

The system in FIG. 1 comprises a user device 102 used by a user, and an access device 104 operated by an entity such as a resource provider (e.g., a merchant). The access device 104 may communicate with the user device 102. The access device 104 may also be in communication with an authorizing entity computer 112 via a service provider computer 106, a transport computer 108, and a processing network computer 110. The access device 104 and the authorizing entity computer 112 can be considered endpoints and nodes in an overall network. The service provider computer 106, the transport computer and the processing network computer 110 can be considered nodes in the overall network.

The service provider computer 106 may be operated by a payment service provider that provides services for the resource provider (e.g., a merchant) operating the access device 104.

The transport computer 108 may be operated by an entity such as an acquirer that holds an account of the resource provider operating the access device 104. An acquirer is typically a system for an entity (e.g., a bank) that has a business relationship with a particular merchant, a wallet provider or another entity. The transport computer 140 may be communicatively coupled to the service provider computer 106, the access device 104, the processing network computer 110 and may issue and manage an account of the resource provider operating the access device 104.

The processing network computer 110 may be in a processing network such as payment processing network. The processing network computer 110 may be operated by an organization such as a payment processing organization. The processing network computer 110 may be configured to provide authorization services, and clearing and settlement services for payment transactions. A processing network computer 150 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services.

The authorizing entity computer 112 may be operated by an authorizing entity such as an issuer. The authorizing entity computer 112 may be operated by an account issuer. Typically the issuer is an entity (e.g., a bank) that issues and maintains an account of the user. The account may be a credit, debit, prepaid, or any other type of account In some embodiments, the user device 102 may include a service provider application such as a mobile wallet application, payment application, or access application that may be provisioned with access data to enable the user device 102 to conduct access transactions. Also, in some embodiments, the user device 102 may be in operative communication with the access device 104 through contactless or contact communication. In some embodiments, the user device 102 can communicate with the access device 104 through a short-range contactless mode of communication such as NFC (near field communications), Bluetooth™, Bluetooth™ Low Energy (BLE), Wi-Fi, etc. In some embodiments, the contactless mode of communication may also include the use of audible signals as well as optical signals.

With reference to FIG. 1, a user operating the user device 102 containing sensitive information such as a PAN can establish communication with the access device 104 in an interaction. Exemplary communications between the user device 102 and the access device 104 are described in detail in FIG. 2 and the description is incorporated herein. As described above, a routing path list (e.g., in Table 1 above) is provided by the access device 104 to the user device 102 and is received by the user device 102. The routing path list can include a first set of network nodes (e.g., at least some of the nodes in Table 1 above). After receiving the routing path list, the user device 102 determines a routing options list comprising a second set of network nodes (e.g., the nodes in Table 2 above) based on the first set of network nodes in the routing path list. In some embodiments, the user device 102 can compare the routing path list (e.g., a first routing path list) that it received from the access device 104 to another routing path list (e.g., a second routing path list) that is stored in the user device 102 to determine a routing options list with compatible nodes. Then, at least the routing options list 130 (e.g., in Table 2 above) and an encrypted PAN 122 (i.e., an example of a credential or a token) are obtained provided (e.g., transmitted) by the user device 102 to the access device 104. The encrypted PAN 122 can be formed by encrypting the PAN 120 with a first cryptographic key.

The access device 104 can generate an authorization request message with at least the routing options list 130 and the encrypted PAN 122. The access device transmits the authorization request message comprising the encrypted credential or token, and the routing options list 130 to the authorizing entity computer 112 via at least some of the network nodes in the second set of network nodes (e.g., the nodes in Table 2 above). For example, the access device 104 can analyze the routing options list and may determine appropriate service provider computer that will receive the authorization request message. For example, if the routing options list is the one shown in Table 2, then the access device 104 can select the service provider or service provider computer 106 associated with the value "901234." The access device 104 may store a routing table with the addresses of the available service provider computers and may route the authorization request message to the service provider computer 106.

The service provider computer 106 can receive the authorization request message and can determine the transport computer 108 using the routing options list 130. The service provider computer 106 can analyze the routing options list 130 in the authorization request message and may determine appropriate transport computer that will receive the authorization request message. For example, if the routing options list is the one shown in Table 2, then the service provider computer 106 can select the transport computer 108 associated with the value "403116." The service provider computer 106 may store a routing table with the addresses of the available transport computers and may route the authorization request message to the transport computer 108.

After receiving the authorization request message, the transport computer 108 can analyze the routing options list 130 in the authorization request message and may determine appropriate processing network computer that will receive the authorization request message. For example, if the routing options list is the one shown in Table 2, then the service provider computer 106 can select the processing network computer 110 associated with the value "40." The transport computer 108 may store a routing table with the addresses of the available processing network computers and may route the authorization request message to the processing network computer 110.

After receiving the authorization request message, the processing network computer 110 can analyze the routing options list in the authorization request message and may determine appropriate authorizing entity computer that will receive the authorization request message. For example, if the routing options list is the one shown in Table 2, then the processing network computer 110 can select the authorizing entity computer 112 associated with the value "40001234." The processing network computer 110 may store a routing table with the addresses of the available authorizing entity computers and may route the authorization request message to the authorizing entity computer 112.

The authorizing entity computer 112 can then receive the authorization request message, extract the encrypted PAN, and then decrypt the encrypted PAN using a second cryptographic key corresponding to the first cryptographic key to obtain the PAN 120. The authorizing entity computer 112 can then evaluate the authorization request message using the PAN and the transaction amount in the authorization request message and may then authorize or decline the transaction. The authorizing entity computer 112 could authorize or decline the transaction based on one or more factors including but not limited to whether the authorization request message is likely legitimate and/or the status of the account associated with the sensitive information (e.g., if the account associated with a PAN or token has sufficient funds or credit to conduct the transaction).

The authorizing entity computer 112 may then send an authorization response message back to the access device 104 via the processing network computer 110, the transport computer 108, the service provider computer 106. The routing options list may also be transmitted in the authorization response message and may be used to route the authorization response message through the illustrated nodes in a similar manner as the authorization request message (but in reverse). Prior sending the authorization request message, the authorizing entity computer 112 can optionally re-encrypt the PAN to form the encrypted PAN, and the authorization response message that is eventually sent back to the access device 104 can include the encrypted PAN.

At the end of the day or at any other suitable period of time, a clearing and settlement processing between the processing network computer 110, the transport computer 108, and the authorizing entity computer 112 may take place.

Figure 2:
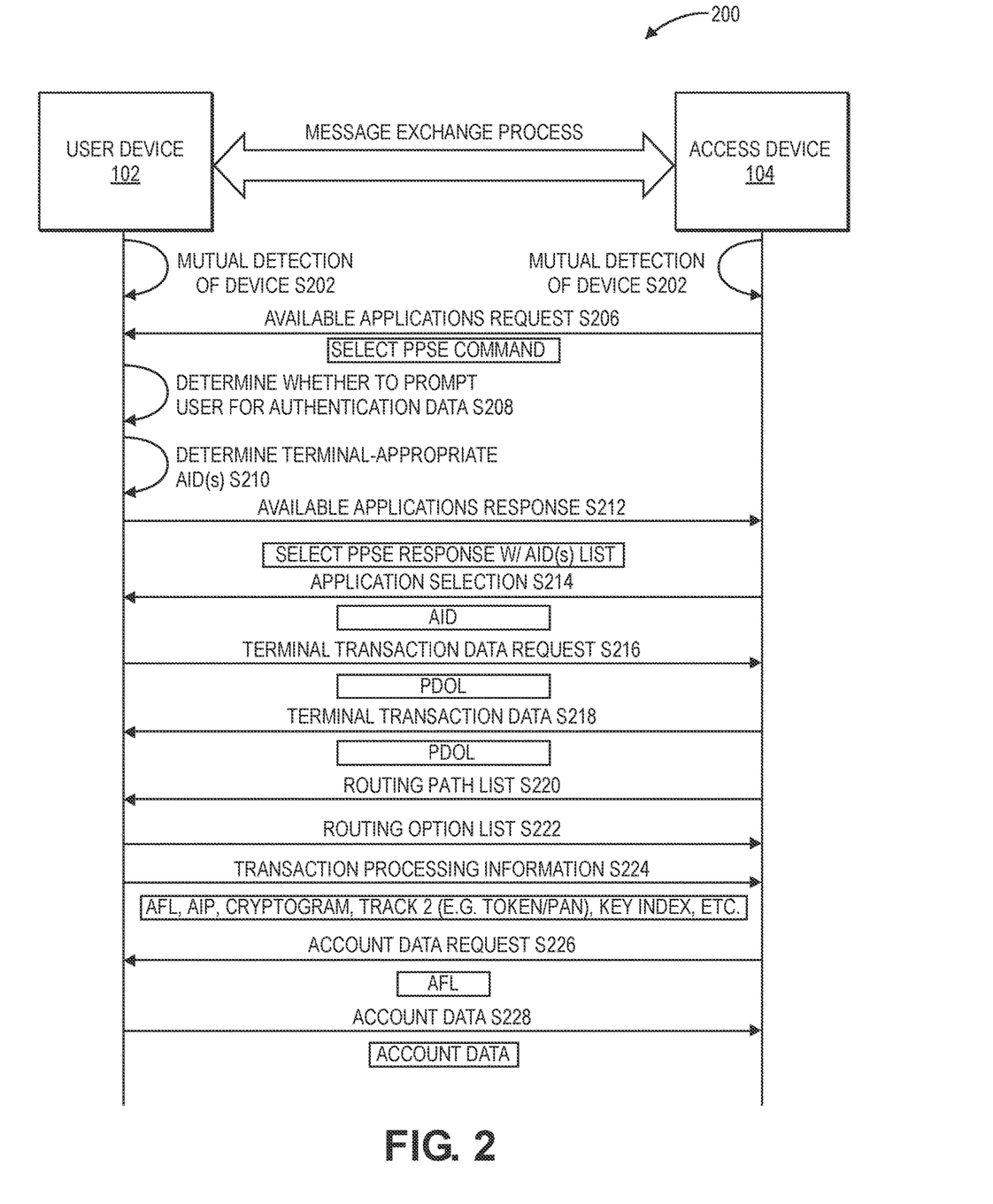
FIG. 2 shows a flow diagram depicting a message exchange process between a user device and an access device, according to an embodiment.

FIG. 2 shows a diagram of a system and a method according to an embodiment of the disclosure. Although a specific sequence and number of steps are shown in FIG. 2, embodiments of the invention are not limited to the specific steps or the specific order of steps. There may also be more or less steps in other methods according to embodiments of the invention than are shown in FIG. 2.

The system 200 comprises an access device 104, which may be associated with a resource provider. The system also comprises a user device 102 which may be associated with a user. A user may use the user device 102 to interact with the access device 104 to gain access to a resource.

In some embodiments, the user can use the user device 102 to conduct purchases at the access device 104. In a purchase transaction, the user device 102 can provide payment credentials to the access device 104, which may initiate a payment authorization process.

The user device 102 may store or have access to certain types of user information. For example, the user device 102 may store the user's payment credentials, such as a PAN (primary account number), a payment token, a name, an address, a CVV, an expiration date, and any other suitable information. Such data may be securely stored via hardware (e.g., a secure element) or software.

The user device 102 may also include a digital wallet application, which may include information about one or more user accounts. The accounts may include a variety of possible types, including, for example, payment accounts such as credit or debit card accounts, and non-payment accounts such as a mass transit account linked to a prepaid card, a building access account, a loyalty rewards program account tied to a particular merchant, an account maintaining pre-purchased ticket information which may be used for obtaining access to an event, etc. The user may be able to add accounts, set a default account, prepare the user device 102 for a transaction, and perform other transaction-related functions via the digital wallet application. In some embodiments, different accounts at the digital wallet application may be associated with different applications, and each application may be associated with an Application Identifier (AID), as described earlier.

The user device 102 may also store information that indicates whether an association exists between one or more of the applications on the user device 102 and one or more access device types, where each access device type may correspond with an access device type identifier (ADTI). This association information may be stored within the memory of the user device 102 (e.g., computer readable medium 102B), which may contain association information for multiple applications on the user device 102. In some embodiments, the association information may be stored directly within a particular application on the user device 102.

Returning to FIG. 2, a method according to the embodiments may also be described. Although the following description includes descriptions of payment processing, it is understood that the method can be used in other contexts (e.g., access to a secure location or secure data).

In one embodiment, the user may select one or more goods and/or services for purchase at a merchant, and then initiate a payment transaction. The user may choose to pay via user device 102. In some embodiments, the user may activate a digital wallet application, select a payment account, and initiate payment functionality on the digital wallet application. At step S202, the user may hold the user device 102 near to the access device 104, such that both devices mutually detect each other.

In some embodiments, a contactless transaction can then be carried out by exchanging messages (e.g., Application Protocol Data Unit (APDU) messages) between the user device 102 and the access device 104. The messages can be in the form of APDU commands sent from the access device 104 to the user device 102, and APDU responses sent from the user device 102 to the access device 104. As described in this method, NFC will be used for the communications. However, embodiments allow other communication means (e.g., BLE, RFID) to be used as well.

At step S206, the access device 104 may send an available applications request message to the user device 102 to request information regarding which applications (e.g., a list of AIDs) may be available on the digital wallet application of user device 102. The available applications request message contains an ADTI for the access device 104. In some embodiments, the available applications request message may be in the form of a SELECT PPSE (proximity payment system environment) command.

At step S208, user device 102 may determine, based at least in part on the ADTI received from access device 104, whether user interaction on the user device is necessary. For example, the user device 102 may determine whether to prompt the user for authentication data. For example, in an embodiment wherein the ADTI value is 'LOYALTY', the user device 102 may determine from the ADTI that the access device 104 supports payment transactions with additional functionality to process loyalty rewards information associated with the user's payment account. Accordingly, the user device 102 may decide to prompt the user for authentication data before proceeding with the transaction and replying back to the access device 104 with an available applications response message.

At step S210, the user device 102 may determine whether an association exists between the ADTI received from the access device 104 and one or more AIDs of a plurality of AIDs stored on the user device 102. The plurality of AIDs respectively correspond to different applications on the user device 102.

At step S212, the user device 102 may transmit to the access device 104, based in part on whether the association determined in step S210 exists, an available applications response (e.g., a PPSE response), comprising the one or more AIDs of the plurality of AIDs associated with the ADTI.

As mentioned above, a SELECT PPSE response message may include file control information (FCI). This may include, but is not limited to, an application definition file (ADF) name, application label, application priority indicator, language preference, kernel identifier indicating the application's kernel preference, and/or additional information relating to the particular ADF. Also, each ADF name may correspond with an AID of an application on the user device 102. Accordingly, the user device 102 may return an application list of one or more directory entries, wherein each directory entry may correspond with an associated AID on the user device 102 and include one or more of the data fields listed above.

At step S214, the access device 104 may determine a mutually supported application based on the received application list of associated AIDs received at step S212. It should be noted that the access device 104 may utilize any suitable mechanism, including, but not limited to, an application priority indicator received from the user device 102, for selecting an application from the application list (e.g., also considering the access device's 104 preferred application (s)). The access device 104 may then send an "application selection" command including the selected AID to the user device 102.

At step S216, the user device 102, upon receiving the application selection message at step S214, may send a terminal transaction data request to request transaction data from the access device 104 which may be needed complete the provisioning process for the selected application associated with the selected AID. In some embodiments, the terminal transaction data request may be in the form of a "Select AID Response" and may include application identifier (AID) file control information (FCI) with the selected AID as the dedicated file name. The terminal transaction data request may include a list of transaction data identifiers to request the appropriate data from the access device 104. The list of transaction data identifiers can be in the form of a processing options data object list (PDOL).

The transaction data requested by the user device 102 for the transaction may include an entity identifier associated with the access device 104, terminal processing options (TPO), an amount, and other information. In addition, the transaction data may include one or more dynamic data elements (e.g., a random number). In other embodiments, the transaction information may be provided as part of the application selection message at step S214.

At step S218, after receiving the terminal transaction data request from user device 102, the access device 104 may send to the user device 102 the terminal transaction data requested by the user device 102. In some embodiments, the terminal transaction data may be sent in the form of a get processing options (GPO) command and may include the requested terminal transaction data in a processing options data object list (PDOL). The terminal transaction data (e.g., Transaction Processing Options (TPO)) may include a TPO indicator that indicates which transaction data types the access device 104 supports.

At step S220, the routing path list as described above may be sent from the access device 104 to the user device 102. Although the transmission of the routing path list is shown as a separate step, before or after step S218, the routing path list can be sent at any other time (e.g., before step S218) in a separate transmission, or as part of the other messages passing from the access device 104 to the user device 102.

At step S222, the routing options list as described above may be sent from the user device 102 to the access device 104. Although the transmission of the routing options list is shown as a separate step, before or after step S218, the routing options list can be sent at any other time (e.g., before step S218) in a separate transmission, or as part of the other messages passing from the user device 102 to the access device 104.

At step S224, once the user device 102 receives the terminal transaction data (from step S218), the user device 102 may obtain relevant credentials (e.g., card credentials), and may send a set of transaction processing information to the access device 104. In some embodiments, the transaction processing information can be sent in the form of a "get processing options" (GPO) response. In some embodiments, the transaction processing information may include one or more application file locators (AFLs) that can be used as file addresses by access device 104 to read account data stored on the user device 102, and an application interchange profile (AIP) that can be used to indicate the capabilities of the payment application.

The transaction processing information may include any credentials for the transaction including a cryptogram generated using transaction information, Track-2 equivalent data (e.g., PAN, expiration date), and/or additional data. For example, the cryptogram may be generated using transaction information, which may include a dynamic data element (e.g., the random number), the user device 102 identifier (e.g., a PAN), and optionally other information such as a session identifier, a value such as a zero dollar amount, and a transaction counter. The transaction processing information may also include issuer application data (IAD), a form factor indicator (FFI), card transaction qualifiers (CTQ), cryptogram information data (CID), and/or an application PAN sequence number (PAN). In some embodiments, the issuer application data (IAD) may include a length indicator indicating the length of the IAD, cryptogram version number (CVN) indicating the version of the transaction cryptogram, a derived key indicator (DKI) that can be used to identify a master key (e.g., a master key associated with the issuer), and/or card verification results (CVR).

As noted above, the user device 102 can use a first cryptographic key to encrypt a credential such as the PAN (or token) before it is sent to the access device in step S224.

At step S226, after the access device 104 receives the transaction processing information, the access device 104 may send an account data request to the user device 102 to read additional account data that may be stored on the user device 102. In some embodiments, the account data request may be in the form of a "read record" command and may include an application file locator (AFL) indicating the location of the account data that the access device 104 is attempting to read. The AFL included in the account data request may correspond to an AFL in the transaction processing information that was provided to the access device 104 from user device 102.

At step S228, in response to receiving the account data request from the access device 104, the user device 102 may send account data stored at the location indicated by the AFL to access device 104. In some embodiments, the account data may be sent in the form of a "read record" response. The account data may include, for example, application usage control that indicates the issuer's restrictions on usage and services allowed for the application, the cardholder's name, customer exclusive data, issuer country code, and/or other account related data that is accessible at the AFL location and is stored in the user device 102.

Figure 3:
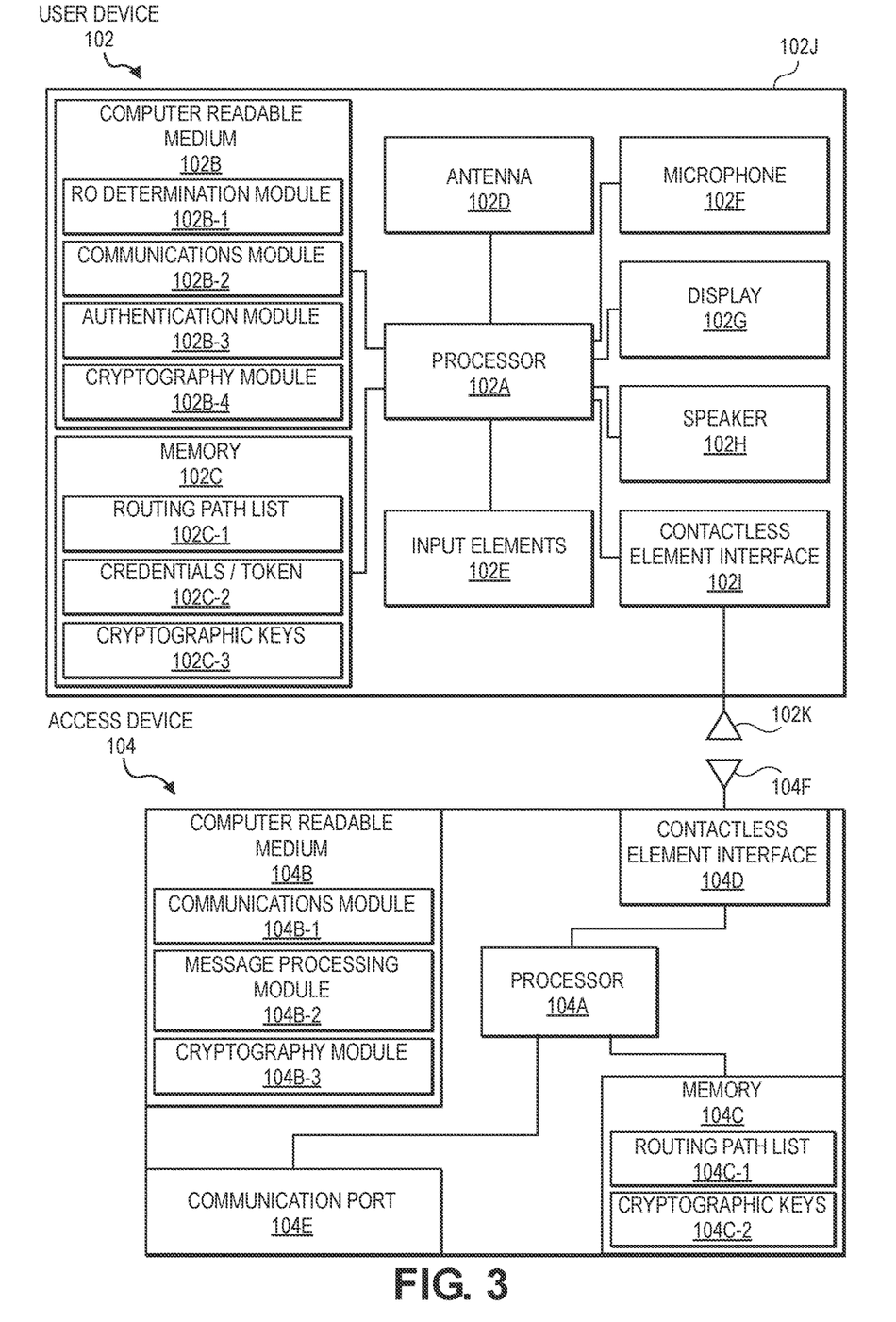
FIG. 3 shows a diagram of a user device and an access device, and some internal components thereof.

FIG. 3 shows block diagrams of a user device 102 and an access device 104 according to embodiments of the invention.

The user device 102 may also include a processor 102A (e.g., a microprocessor) for processing the functions of the user device 102 and a display 102G to allow a user to view information. The user device 102 may further include input elements 102E (e.g., a touchscreen, keyboard, touchpad, sensors such as biometric sensors, etc.), a speaker 102H, and a microphone 102F, each of which is operatively coupled to the processor 102A. A contactless element interface 102I, an antenna 102D, a memory 102C, and a computer readable medium 102B may also be operatively coupled to the processor 102A.

The computer readable medium 102B and the memory 102C may be present within a body 102J. The body 102J may be in the form a plastic substrate, housing, or other structure. In some cases, the memory 102C may store information such as a routing path list 102C-1, credentials/tokens 102C-2, and cryptographic keys 102C-3, etc. Information may be transmitted by the user device 102 to another device using an antenna 102D or contactless element interface 102I. The user device 102 may use antenna 102D for wireless data transfer (e.g., using wireless networking protocols such as IEEE (Institute of Electronics Engineers) 802.11) or mobile phone communication (e.g., 3G, 4G, and/or LTE). Antenna 102K of contactless element interface 102I may be configured for sending and receiving wireless signals at a frequency specified by different wireless protocols such as NFC (Near Field Communication), BLE (Bluetooth Low Energy), RFID (Radio Frequency Identifier), or any other suitable form of short or medium range communications mechanism.

In some embodiments, the contactless element interface 102I is implemented in the form of a semiconductor chip (or other data storage element) with an associated wireless transfer (e.g., data transmission) element, such as an antenna. Data or control instructions that are transmitted via a cellular network may be applied to the contactless element interface 102I. Contactless element interface 102I may be capable of transferring and receiving data using a short range wireless communication capability. Thus, the user device 102 may be capable of communicating and transferring data or control instructions via both a cellular network (or any other suitable wireless network—e.g., the Internet or other data network) or any short range communications mechanism.

The computer readable medium 102B may comprise code, executable by the processor, for implementing methods according to embodiments. For example, the computer readable medium 102B may comprise code, executable by the processor 102A for implementing a method comprising: establishing communication between a user device and an access device in an interaction; receiving, from the access device, a routing path list comprising a first set of network nodes; after receiving the routing path list, determining a routing options list comprising a second set of network nodes based on the first set of network nodes in the routing path list; obtaining an encrypted credential or token; and transmitting, to the access device, the routing options list, and the encrypted credential or token to the access device, wherein the access device transmits an authorization request message comprising the encrypted credential or token, and the routing options list to a server computer via at least some of the network nodes in the second set of network nodes.

The computer readable medium 102B may contain one or more applications as described above. The computer readable medium 102B may also comprise a routing options determination module 102B-1, a communications module 102B-2, an authentication module 102B-3, and a cryptography module 102B-4.

The routing options determination module 102B-1 and the processor 102A can determine a routing options list as described above using a routing path list received from the access device 104 and the routing path list 102C-1 stored in the memory 102C.

The communications module 102B-2 and the processor 102A can manage and control the communications that are received by and provided by the user device 102.

The authentication module 102B-3 and the processor 102A can have rules regarding how and when to authenticate a user of the user device 102 when conducting transactions with the user device 102.

The cryptography module 102B-4 and the processor 102A can perform cryptographic operations including encrypting data, decrypting data, signing data, verifying data, hashing data, etc.

The access device 104 includes a processor 104A. The processor 104A may be operatively coupled to a computer readable medium 104B and a memory 104C. The memory 104C may comprise a routing path list 104C-1 and cryptographic keys 104C-2. The access device 104 may also comprise a contactless element interface 104D which may include an antenna 104F, and a communication port 104E. Contactless element interface 104D is configured to communicate with (send and/or receive data) the contactless element interface 102I of the user device 102. In one embodiment, the communication port 104E includes hardware to facilitate wireless network communication (e.g., IEEE 802.11).

The computer readable medium 104B may comprise code, executable by the processor 104A to perform a method comprising: establishing communication between a user device and an access device in an interaction; transmitting, by the access device to the user device, a routing path list comprising a first set of network nodes; receiving, by the access device from the user device, a routing options list comprising a second set of network nodes based on the first set of network nodes in the routing path list, and an encrypted credential or token; generating, by the access device, and an authorization request message comprising the encrypted credential or token, and the routing options list; and transmitting, by the access device to a server computer via at least some of the network nodes in the second set of network nodes, the authorization request message comprising the encrypted credential or token.

The computer readable medium 104B may also comprise a communications module 104B-1, a message processing module 104B-2, and a cryptography module 104B-3.

The communications module 104B-1 and the processor 104A can manage and control the communications that are received by and provided by the access device 104.

The message processing module 104B-2 and the processor 104A can generate, transmit and process transaction messages such as authorization request and response messages.

The cryptography module 104B-3 and the processor 104A can perform cryptographic operations including encrypting data, decrypting data, signing data, verifying data, hashing data, etc.

Figure 4:
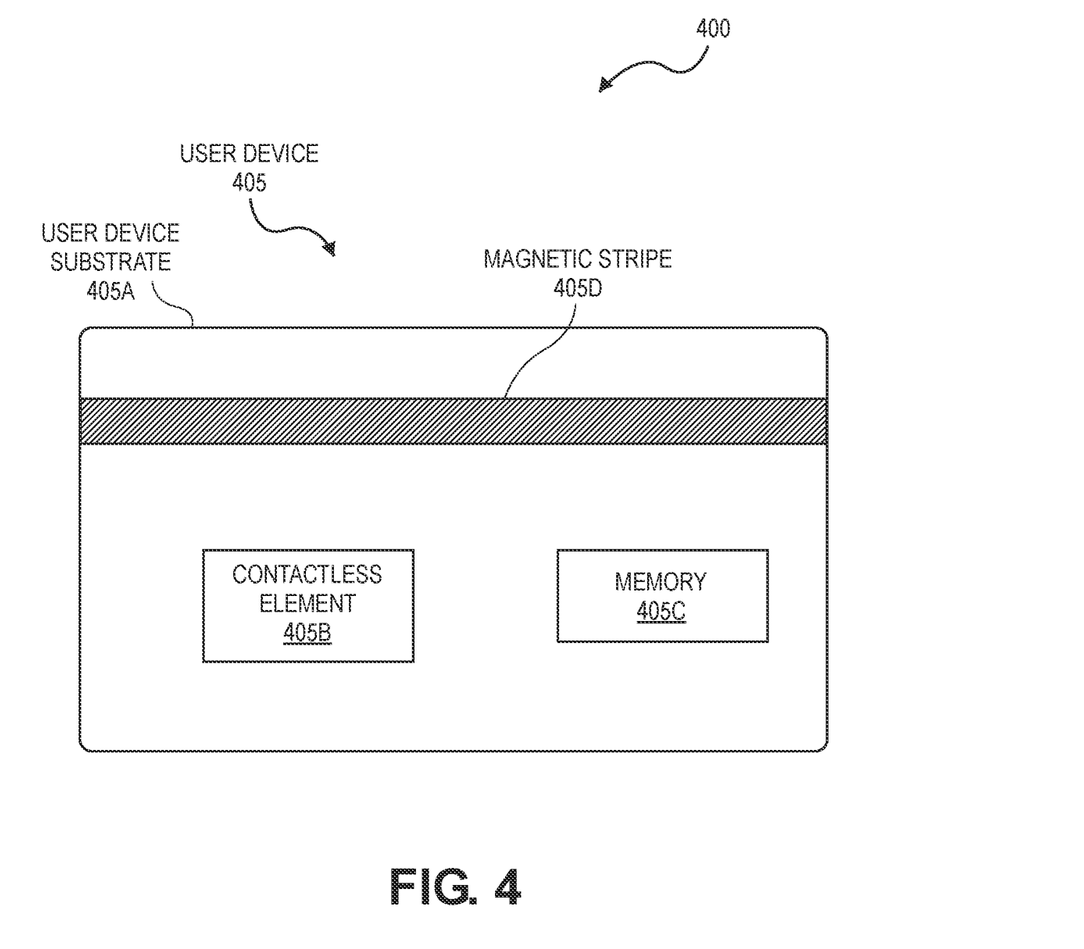
FIG. 4 shows a diagram illustrating a user device in the form of a card.

FIG. 4 shows a user device 405 in the form of a card. The user device 405 comprises a substrate 405A such as a plastic substrate. A contactless element 405B for interfacing with a data access or data transfer device may be on or embedded within the substrate 405A. The contactless element 405B may include a chip, and may include the capability to communicate and transfer data using near field communications (NFC) technology or other short range communications technology. The user device 405 may also include a memory 405C, which may store user information such as an account number, expiration date, and a username. Such information may also be printed or embossed on the substrate 405A. The substrate 405A may also have a magnetic stripe 405D on it.

Embodiments of the invention have several advantages. By providing the routing options list in an authorization request message, the authorization request message can be routed to an endpoint (e.g., an authorizing entity computer) without using the credential (e.g., PAN) or token of the user conducting the transaction. The credential or token can be encrypted by the user device being used by the user and can be decrypted by an authorizing entity computer operated by an authorizing entity that issued the user device. The credential or token is therefore secure and cannot be obtained by man-in-the-middle in a man-in-the-middle attack, and further cannot be viewed or analyzed by any nodes between the endpoints in the overall network. Further, embodiments of the invention need not use complex point-to-point encryption schemes to achieve improved data security. Embodiments of the invention need not use complex key management processes as in point-to-point encryption schemes.

It should be understood that any of the embodiments of the present disclosure can be implemented in the form of control logic using hardware (e.g., an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   establishing communication between a user device and an access device in an interaction;
   receiving, by the user device from the access device, a routing path list comprising a first set of network nodes;
   after receiving the routing path list, determining, by the user device, a routing options list comprising a second set of network nodes based on the first set of network nodes in the routing path list;
   obtaining, by the user device, an encrypted credential or token; and
   transmitting, by the user device to the access device, the routing options list, and the encrypted credential or token to the access device, wherein the access device transmits an authorization request message comprising the encrypted credential or token, and the routing options list to a server computer via at least some of the network nodes in the second set of network nodes.

2. The method of claim 1, wherein the encrypted credential or token is formed using a first cryptographic key, and wherein the server computer decrypts the encrypted credential or token with a second cryptographic key, wherein the server computer is an authorizing entity computer.

3. The method of claim 1, wherein the authorization request message is transmitted to the server computer via a transport computer and a processing network computer while the encrypted credential or token remains encrypted.

4. The method of claim 1, wherein the user device obtains the credential.

5. The method of claim 1, wherein the routing path list is a first routing path list, and wherein determining the routing options list comprises comparing the first routing path list with a second routing path list in the user device to determine the routing options list.

6. The method of claim 1, wherein the user device is in the form of a card.

7. The method of claim 1, wherein the authorization request message is transmitted to the server computer via a transport computer and a processing network computer while the encrypted credential or token remains encrypted, and wherein the transport computer, the processing network computer, and the server computer are nodes in the second set of network nodes.

8. The method of claim 1, wherein the routing path list is received from the access device by the user device via a short-range communication medium.

9. The method of claim 1, further comprising:
   encrypting, by the user device, a credential or token using a cryptographic key to form the encrypted credential or token.

10. The method of claim 1, wherein the access device is an access terminal.

11. The method of claim 1, wherein the routing options list comprises a tag and value associated with each node in the second set of network nodes.

12. A user device comprising:
a processor; and
a non-transitory computer readable medium, coupled to the processor, the non-transitory computer readable medium comprising code, executable by the processor, for implementing a method comprising:
establishing communication between the user device and an access device in an interaction;
receiving, from the access device, a routing path list comprising a first set of network nodes;
after receiving the routing path list, determining a routing options list comprising a second set of network nodes based on the first set of network nodes in the routing path list;
obtaining an encrypted credential or token; and
transmitting, to the access device, the routing options list, and the encrypted credential or token to the access device, wherein the access device transmits an authorization request message comprising the encrypted credential or token, and the routing options list to a server computer via at least some of the network nodes in the second set of network nodes.

13. The user device of claim 12, wherein the user device is in the form of a card.

14. The user device of claim 12, wherein the user device is in the form of a card, which is configured to communicate with the access device via physical and electrical contact.

15. A method comprising:
establishing communication between a user device and an access device in an interaction;
transmitting, by the access device to the user device, a routing path list comprising a first set of network nodes;
receiving, by the access device from the user device, a routing options list comprising a second set of network nodes based on the first set of network nodes in the routing path list, and an encrypted credential or token;
generating, by the access device, an authorization request message comprising the encrypted credential or token, and the routing options list; and
transmitting, by the access device to a server computer via at least some of the network nodes in the second set of network nodes, the authorization request message comprising the encrypted credential or token.

16. The method of claim 15, wherein the authorization request message is transmitted to the server computer via a transport computer and a processing network computer while the encrypted credential or token remains encrypted.

17. The method of claim 15, wherein the user device is a card and the access device is a terminal.

18. The method of claim 15, wherein the user device and the access device communicate via a short range communication medium.

19. The method of claim 15, wherein the routing path list is a first routing path list, and wherein the user device determines the routing options list by comparing the first routing path list with a second routing path list in the user device to determine the routing options list.

20. The method of claim 15, wherein the authorization request message is transmitted to the server computer via a transport computer and a processing network computer while the encrypted credential or token remains encrypted, wherein the server computer is an authorizing entity computer.

* * * * *